United States Patent [19]

Silverthorn

[11] Patent Number: 4,833,817
[45] Date of Patent: May 30, 1989

[54] FISH HOOK EXTRACTOR

[76] Inventor: Dennis W. Silverthorn, 19921 SW. 103 Ave., Miami, Fla. 33157

[21] Appl. No.: 204,858

[22] Filed: Jun. 10, 1988

[51] Int. Cl.$^4$ .............................................. A01K 97/00
[52] U.S. Cl. ...................................................... 43/53.5
[58] Field of Search ..................................... 43/53.5, 5

[56] References Cited

U.S. PATENT DOCUMENTS

| | | | |
|---|---|---|---|
| 1,539,221 | 5/1925 | Tennant | 43/53.5 |
| 2,537,879 | 1/1951 | Culhane | 43/53.5 |
| 2,688,816 | 9/1954 | Bondesen | 43/53.5 |
| 2,892,284 | 6/1959 | Shawhan | 43/53.5 |
| 3,001,320 | 9/1961 | Sonner | 43/53.5 |
| 3,419,924 | 1/1969 | Archibald | 43/53.5 |
| 4,342,171 | 8/1982 | Cripps | 43/53.5 |
| 4,590,702 | 5/1986 | Chestnutt | 43/53.5 |

*Primary Examiner*—Gene P. Crosby
*Attorney, Agent, or Firm*—Richard C. Litman

[57] ABSTRACT

A device for extracting a fish hook from a fish caught thereby comprises a tubular housing with a sliding plunger housed therein fastened to a clamping hook extending beyond the front end of the housing so that when a retractor handle and fixed handle are squeezed together the clamping hook is retracted into the housing whereby it engages any article extending laterally across the two receiving slots and clamps the article therein. The device grips the fish hook and locks it in the receiving slots so that rotation relative to longitudinal axis of the device is prevented while still allowing the hook to rotate within the receiving slots if it is desired. With the fish hook firmly grasped, the device allows the fish hook to be easily and safely manipulated in order to free it from the hooked fish. When a large fish hook or the like is held by the device, said device has the additional ability of serving as a gaff for safely handling dead or live fish.

2 Claims, 3 Drawing Sheets

FISH HOOK EXTRACTOR

FIELD OF THE INVENTION

The present invention relates to fishing, and more particularly the present invention relates to means for gripping a fish hook, or the like, in order to facilitate the removal thereof from the mouth or throat or any other part of a fish.

BACKGROUND OF THE INVENTION

After a fish has been caught by using a fish hook, it is desirable to extract and recover the fish hook which may be lodged in the lip, mouth, or deep in the throat of the fish. However, this can be a difficult as well as dangerous task. Both the hook and the fish are potentially hazardous to the fisherman—the fish having sharp teeth in its mouth and sharp spines in its fins and the fish hook having a barbed point.

Consequently, the need arises for a means to easily and safely handle the fish and the fish hook, particularly during the process of removing the fish hook from the fish.

DESCRIPTION OF THE PRIOR ART

Various prior art fish hook extracting devices and the like, as well as their apparatuses and the method of their construction in general, are known and are found to be exemplary of the U.S. prior art. However, of these, only U.S. Pat. No. 3,419,924 issued to Archibald is relevant to the present invention in other than a broad sense.

U.S. Pat. No. 3,419,924 discloses a Hook Holder And Line Cutter having a sleeve guide formed with a serrated outer tip into which a fish hook may be inserted, together with a reciprocatable plunger formed with a recessed catch in a lateral side thereof for engaging with the hook and clamping the latter in the serrations of the sleeve guide. The device in U.S. Pat. No. 3,419,924 relies on a compression spring to supply the force that retracts the recessed catch of the plunger into the sleeve guide past the serrated outer tip and thereby clamp any slender article, such as a fish hook or the like, which is placed within said recessed catch.

The device is operated by pressing in a button on the end of the plunger opposite the end with the recessed catch. Pressing in the button causes the plunger to move relative to the tubular handle and sleeve guide which surround it, thereby bringing the recessed catch out from inside the tubular handle and the sleeve guide past the serrations. With the recessed catch exposed, it is possible to insert the shaft of a fish hook, or the like, therewithin. Consequently, when the pressure is released from the button, the spring is permitted to expand and thereby retract the exposed portion of the plunger and the recessed catch thereof back within the tubular handle and sleeve guide. However, with an article laterally traversing the recessed catch, the plunger cannot be fully retracted, and the article is clamped between said catch and the serrations in the edge of the sleeve guide. The spring maintains a constant pressure, providing a continuous grip on the article.

A problem arises with the foregoing device when it is desired to grip an article with more force than the spring is able to exert. Since the spring must be compressed by pressing in the button with a finger, the spring chosen to be incorporated in the device cannot require a large force in order to be compressed far enough to expose the recessed catch. Therefore, since the spring cannot exert a retracting force greater than the force required to depress the button, the device would be inadequate and undesirable to grip or clamp an article which resists the gripping or clamping action with a force greater than could be easily exerted by a finger—as in the case when a fish hook has been deeply or firmly embedded in a tough material which is resistant to tearing, such as the flesh of a shark or stingray for instance.

SUMMARY OF THE INVENTION

An object, advantage, and feature of the present invention is to provide a novel tool for use by fisherman that is safe, versatile, and efficient in use, and lends itself to the extraction of fish hooks from the mouth or throat of a fish caught thereby.

Another object of the invention is to provide a novel and improved construction of a fish hook holding and extracting tool, to wit, the employment of a retractable hook or catch fastened to, or formed within, the end of a sliding plunger which interacts with two receiving slots formed in the front edge of a tubular housing to provide a clamping and gripping action which is actuated by closing a hand around a retractor handle and a fixed handle and squeezing said handles together, thus allowing the benefit of virtually the full force of the user's grip to be transmitted to the gripping action of the device. This is a substantial improvement over existing practices whereby the device provides increased control over the amount of grip the device exerts and decreased limitation of the amount of gripping force possible.

Another object of the invention is directed further to a device providing means to grip a fish hook and hold it locked in different orientations so that the extraction of said fish hook can be performed in whichever manner is easiest according to the way the fish has been hooked.

Furthermore, another object is to provide means to facilitate the extraction of a fish hook from a fish by providing means to easily manipulate and maneuver said fish hook in order to dislodge it.

These, together with other objects and advantages of the invention reside in the details of the process and the operation thereof, as is more fully hereinafter described and claimed. References are made to drawings forming a part hereof, wherein like numerals refer to like parts throughout.

DESCRIPTION OF THE PREFERRED EMBODIMENT

Figure 1:
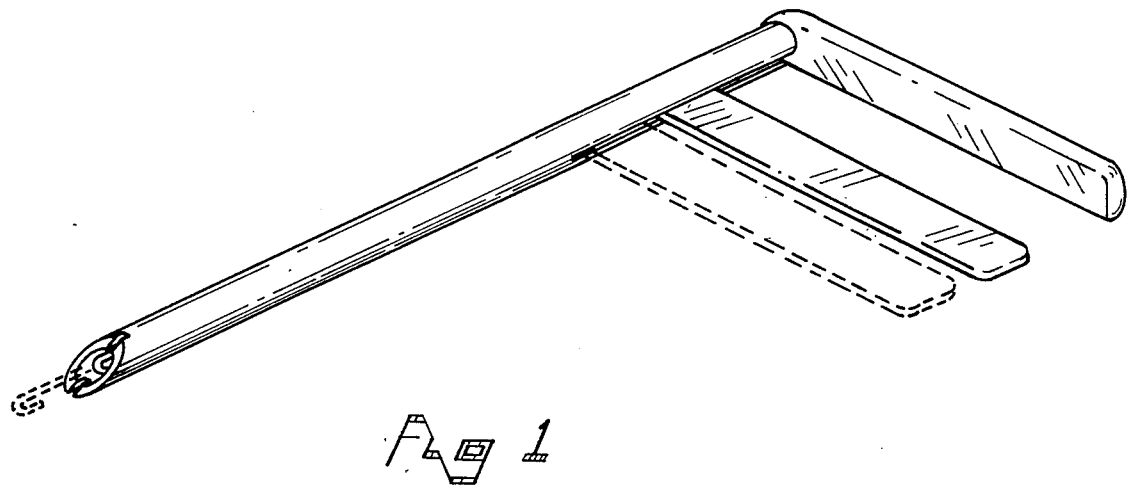
FIG. 1 is a perspective view of the fish hook extractor showing the clamping hook and retractor handle fully retracted.
Figure 2:
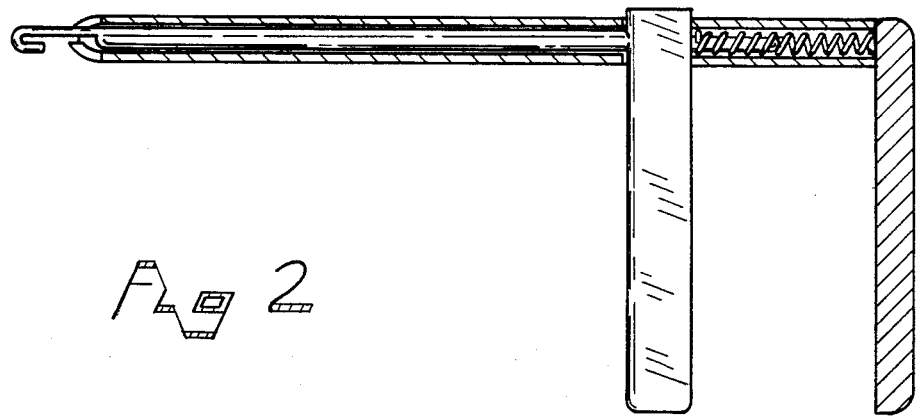
FIG. 2 is a sectional view of the invention.
Figure 3:
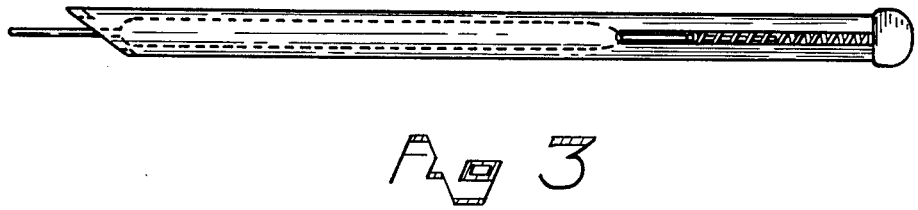
FIG. 3 is a side view with the clamping hook in the fully extended position.

Referring now to the drawing, particularly FIG. 1, there is shown a fish hook extractor comprising an elongated tubular housing 10 with two diametrically opposed receiving slots 12 and 14 formed in the front edge of said tubular housing. The rear end of said tubular housing is provided with two diametrically opposed longitudinally disposed parallel guide slots 13 and 15—both of the same length and positioned equally along the longitudinal axis. Said guide slots define a plane perpendicular to the plane defined by the receiving slots 12 and 14. A sliding plunger 20 extending along the longitudinal axis of said elongated tubular housing and being contained therein has a clamping hook 22 attached to the front end thereof and a retractor handle 30 attached to the rear end. Said clamping hook 22 and retractor handle 30 are fastened to said plunger so that all lie substantially within the same plane. And furthermore, said retractor handle is attached to the rear end of the sliding plunger so that the length of the handle is perpendicular to the longitudinal axis of the sliding plunger with a small portion 31 of one end of the retractor handle extending beyond the side of the sliding plunger and the remainder extending beyond the opposite side of the plunger. With the sliding plunger contained within the tubular housing, said retractor handle extends laterally across the tubular housing through the diametrically opposed longitudinally disposed guide slots 13 and 15. The portion 31 protrudes through the guide slot 15 just beyond the exterior of the tubular of the tubular housing. Therefore, with portion 31 extending through the guide slot 15 and the remainder of the length of the retractor handle 30 extending out through the opposed guide slot 13, the retractor handle and the sliding plunger attached thereto are prevented from rotating relative to the tubular housing 10.

Attached to the rear end of the tubular housing is a fixed handle 40. The fixed handle 40 is attached perpendicular to the longitudinal axis of the tubular housing with one end of the handle flush to the side of the housing and the remainder protruding out beyond the opposite side. The fixed handle is parallel to the retractor handle and projects out from the same side of the tubular housing as the retractor handle. Both the fixed handle and the retractor handle lie within the plane defined by the two diametrically opposed guide slots 13 and 15. Inside the housing, a compression spring 50 is between the retractor handle 30 and the fixed handle 40. The rear end of the spring rests against the portion of the fixed handle covering the rear end of the housing, and the front end of the spring engages the rearwardly facing side of the retractor handle located inside the housing between the guide slots. In this manner, the spring forces said retractor handle against the front ends of the matching diametrically opposed guide slots and extends the sliding plunger and the clamping hook attached to the front end thereof to the forward-most position with the clamping hook protruding beyond the front edge of the tubular housing. Pulling the retractor handle back towards the fixed handle causes the plunger to slide backwards relative to the housing—compressing the spring—and retracts the clamping hook into the opening at the front end of the housing.

However, it is undesirable for the clamping hook to be retracted into the tubular housing past the point where it intersects the line defined by the rear-most points of the receiving slots; this tends to bend small, very slender hooks, folding them over and pulling them back inside the tubular housing along with the clamping hook. Therefore, means is provided for preventing the "clamping hook—sliding plunger—retracting handle" assembly from moving too far back into the tubular housing whereby the clamping hook is retracted back beyond the line defined by the two rear-most points of the receiving slots.

In the embodiment shown in the drawing, the means for preventing the clamping hook from being retracted back into the housing beyond a desirable point is a spacing pin 60 inserted inside the cylinder defined by the compression spring 50. Alternately, a spacing collar of the same length as the spacing pin can replace said spacing pin. The spacing collar fits closely around the outside of the tubular housing between the retractor handle and the fixed handle. Another alternative to the spacing pin 60 is to manufacture the compression spring 50 so that when it is completely compressed, with each coil making contact with the adjacent coils, the length of the compression spring is the same as the length of the spacing pin—thus making the use of a spacing pin or spacing collar unnecessary.

Figure 4:
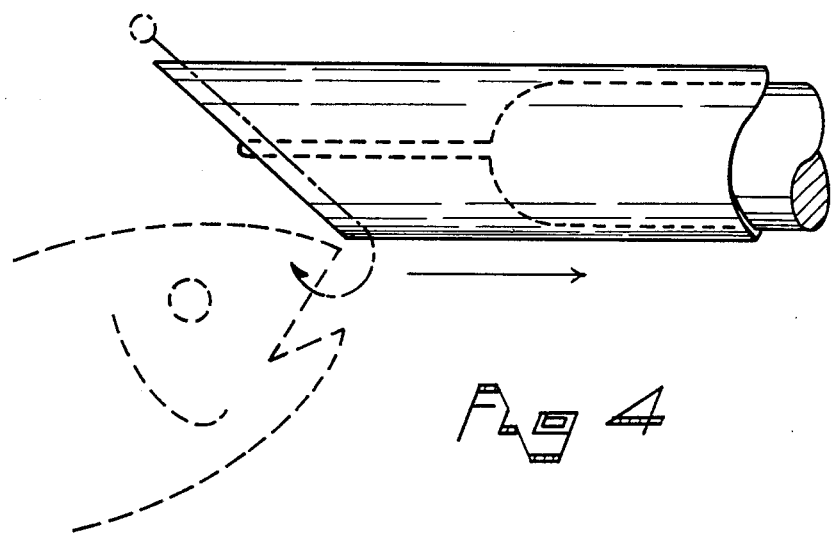
FIG. 4 is an auxiliary view focusing on the operation of the device when gripping a hook with the front-most slot positioned up towards the eye of the fish hook.
Figure 5:
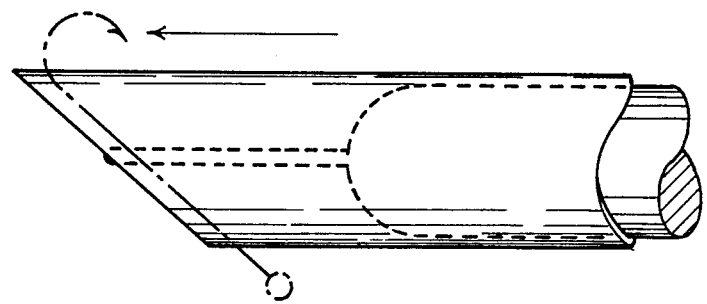
FIG. 5 is an auxiliary view focusing on the operation of the device when gripping a hook with the front-most slot positioned down towards the beginning of the curve of the hook.

In order to provide the device with the ability to grip a fish hook and hold said fish hook locked in a greater variety of different positions, the receiving slots are formed so that the rearmost points thereof define a line which is at an angle away from the perpendicular to the longitudinal axis of the tubular housing and sliding plunger. In the example of the present invention shown in the drawing, this angle is provided by cutting the front end of the tubular housing so that the front edge of the tubular housing defines a plane at the desired angle relative to the longitudinal axis of said housing. The two receiving slots are formed with equal lengths at the rearward-most and forward-most points along the front edge of the tubular housing. Thus, the rear-most points of the two diametrically opposed receiving slots which are of equal length and are positioned at the rearmost and front-most points along the angled front edge of the tubular housing, define a line parallel to the plane defined by the front edge of the tubular housing, said line and plane being at an angle relative to the longitudinal axis of the tubular housing other than the perpendicular. FIGS. 4 and 5 illustrate how this configuration enables the user of the device to hold a fish hook locked in different positions.

In FIG. 4 the front-most receiving slot 14 is positioned along the end of the fish hook 80 towards the eye 81 of the fish hook. Consequently, when the clamping hook 22 engages the fish hook 80 and pulls it back into both receiving slots, the position of the fish hook relative to the hooked fish become inverted. Thus, when a fish is hooked in the lip or mouth, it is possible to hold the fish hook so that the point of the fish hook is reversed, enabling the user to easily pull the fish hook from the mouth of the fish or shake the fish off of the fish hook.

In FIG. 5 the front-most receiving slot 14 is made to engage the fish hook at the curved end 82 of the fish hook 80. Thus, when the clamping hook 22 pulls the fish hook into engagement with both receiving slots, the fish hook is locked into a position whereby its orientation relative to the fish is relatively unchanged. If the fish has been hooked deep in the throat, it may be necessary to grip the hook with this positioning so that the hook may be pushed further back into the fish (opposite the direction of the point) until it becomes disengaged from the fish and can be carefully withdrawn out from within the fish.

To further aid in dislodging and removing a fish hook, the handles (i.e., the retractor handle and the fixed handle) provide the added benefit of leverage means to help twist the fish hook held by the device in order to help free it from the fish. The handles allow the fish hook to be rotated 180° in order to help dislodge it.

Additionally, the structural configuration of the present invention also enables the user to implement a swinging technique to remove a fish from a fish hook without ever having to touch the fish. Instead of twisting the fish hook extractor relative to the fish with the fish held stationary, it is possible to rotate (or swing) the fish around the fish hook and the fish hook extractor so that the fish twists free of the fish hook and falls off.

Figure 7:
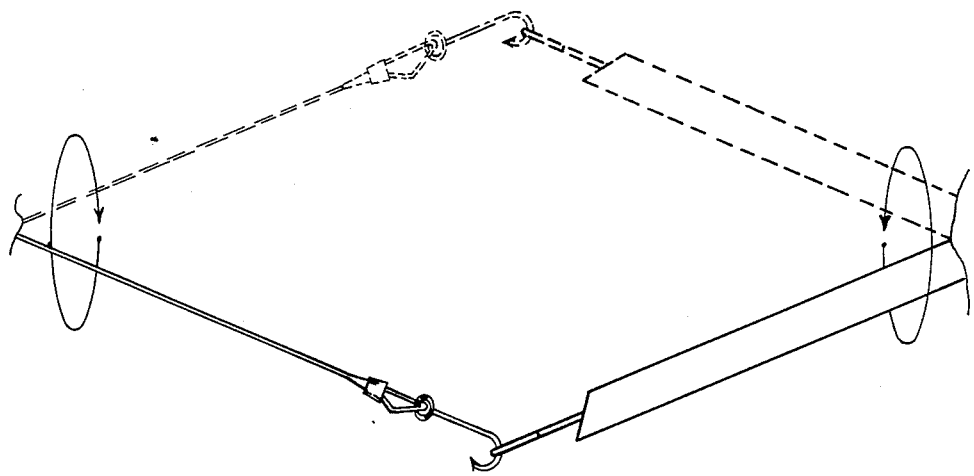
FIG. 7 is a partial perspective view of the invention in use illustrating a technique for removing a fish from a fish hook attached to a leader.

With one hand holding the fish suspended from the leader attached to the fish hook embedded in the mouth of the fish and with the opposite hand holding the fish hook extractor by the fixed handle, the clamping hook of the fish hook extractor can be caught around the leader and pulled down and to the side away from the hand holding the fish suspended from the leader so that the clamping hook slides down around the shaft of the fish hook. With the aforementioned procedure accomplished, the fish is held in front of the user between the user's outstretched arms, suspended by the leader and the fish hook extractor which are held opposite each other in the frontwardly-projecting opposed hands of the user. At this point, by simultaneously jerking both hands in a synchronized circular motion initiated towards the user, the fish can be swung towards the user and up, over and around the leader and the fish hook extractor holding the fish hook so that the fish rotates a full 360° there around and is thereby caused to twist free from the fish hook (as illustrated in FIG. 7). With a little practice, it is possible for the user to acquire the ability to aim the fish as it is twisted off the hook in the above-described manner and control where the fish lands, allowing the user to swing the fish off the fish hook into a storage container or back into the water if it is the desire of the user to release the fish after it has been caught.

Figure 6:
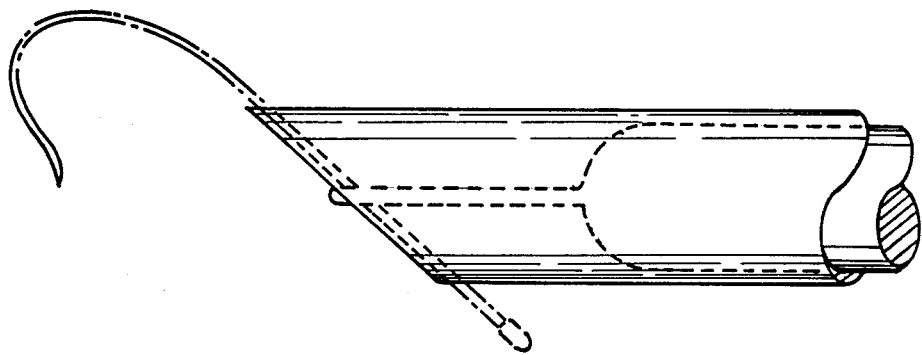
FIG. 6 is an auxiliary view of the invention holding a hook so that the invention can be used as a gaff.

As previously pointed out, it is not only difficult and hazardous to remove a fish hook from a fish, it is also often dangerous to handle a fish without the proper equipment, such as a gaff. Handling fish without the proper equipment, whether alive or dead, can be hazardous since most fish are slippery and have sharp spines in their fins and, with many species, sharp teeth in their mouths. By holding a large fish hook, preferably with the barb removed, or a similar article, the present invention can be used to safely handle fish. By holding the large fish hook with the present invention as shown in FIG. 6 the device readily serves as a gaff. Since the device allows the user to grip the fish hook with the full force of his grip, the device, when used as a gaff as described above, can be used to handle fish of considerable weight.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications, and equivalents which may be resorted to, fall within the scope of the invention.

What is claimed is:

1. A tool for holding and extracting fish hooks comprising:
   an elongated tubular housing;
   a sliding plunger of a shorter length than said elongated tubular housing and contained therein;
   a clamping hook fastened to the front end of the sliding plunger;
   a retractor handle attached to the rear end of said sliding plunger perpendicular to the longitudinal axis thereof;
   two receiving slots formed in the edge of the front end of said tubular housing;
   said receiving slots being formed so that the line defined by the rearmost points thereof is at an angle other than the perpendicular to the longitudinal axis of said tubular housing;
   said hook interacting with said two receiving slots for clamping a slender article and preventing rotation of said slender article about the longitudinal axis of said tubular housing;
   said receiving slots defining a plane disposed perpendicular to the plane which said clamping hook lies within;
   said retractor handle attached to the rear end of said sliding plunger providing means to actuate gripping action;
   two parallel longitudinally disposed guide slots of the same length formed in the housing at the rear end thereof defining a plane and confining the motion of said retractor handle therewithin;
   a fixed handle attached to the rear end of the housing; said fixed handle being perpendicularly disposed relative to said tubular housing and coplanar and parallel to said retracting handle;
   a compression spring contained within said tubular housing in the space between the retractor handle and the fixed handle;
   said compression spring being compressible along the longitudinal axis of the tubular housing;
   said compression spring compressing when the retractor handle is pulled towards the fixed handle and re-extending when the retractor handle is released; and
   means for preventing said hook from being retracted into the tubular housing past the line defined by the two rearmost points of said receiving slots.

2. The device of claim 1 wherein the means for preventing the hook from being retracted into said tubular housing past the line defined by the two rearmost points of the two receiving slots comprises:
   a spacing pin inserted inside the cylinder defined by said coiled spring;
   said spacing pin being of a length that allows said spring to be compressed by the retractor handle actuating the retraction of said hook into said tubular housing but prevents said retractor handle from compressing said spring beyond a point whereby said hook would be retracted into said tubular housing beyond the line defined by the two rearmost points of the two receiving slots.

* * * * *